United States Patent [19]

Shimazu et al.

[11] 4,382,522
[45] May 10, 1983

[54] TAPE COVER OF MAGNETIC TAPE CASSETTE AND PROCESS FOR PREPARING TAPE COVER

[75] Inventors: Seiki Shimazu; Masaoki Sekine, both of Tokyo, Japan

[73] Assignee: TDK Electronics Co., Ltd., Tokyo, Japan

[21] Appl. No.: 201,910

[22] Filed: Oct. 29, 1980

[30] Foreign Application Priority Data

Nov. 13, 1979 [JP] Japan .................... 54/146069

[51] Int. Cl.³ .............. B65D 43/16; B29G 2/00; G03B 1/04
[52] U.S. Cl. .................... 220/337; 206/387; 242/198; 264/328.9
[58] Field of Search .............. 206/387; 220/337; 242/198; 253/18; 264/328.9

[56] References Cited

U.S. PATENT DOCUMENTS 3,650,378  3/1972  Kakiuchi et al. ............... 353/18
3,900,171  8/1975  Serizawa ...................... 242/198
3,980,255  9/1976  Serizawa ...................... 242/198

Primary Examiner—William T. Dixson, Jr.
Attorney, Agent, or Firm—Oblon, Fisher, Spivak, McClelland & Maier

[57] ABSTRACT

A tape cover made of resin comprises a single-piece L-shaped body of an upper plate and a front plate and an erroneous insertion detecting notch formed in the joint of the plates, wherein a gate is formed in the notch and the thickness of the wall of a portion adjacent the notch in the upper plate is smaller than the distance from the edge of the upper plate to the most remote part of the diameter of the gate.

2 Claims, 8 Drawing Figures

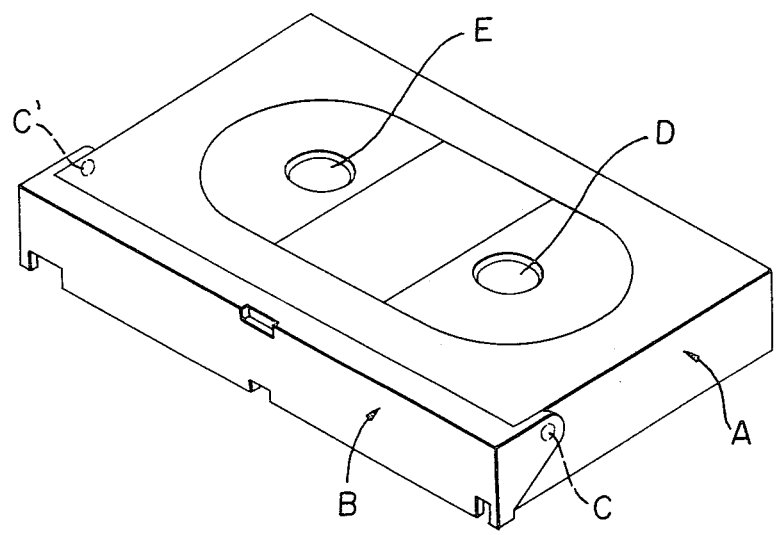
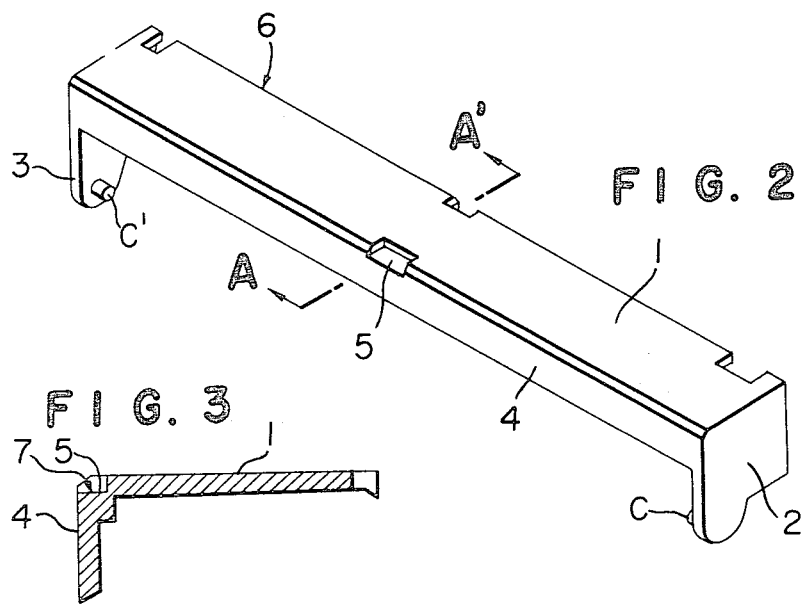
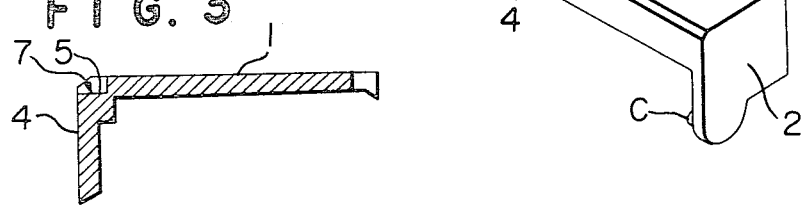

TAPE COVER OF MAGNETIC TAPE CASSETTE AND PROCESS FOR PREPARING TAPE COVER

BACKGROUND OF THE INVENTION

1. Field of the Invention

The present invention relates to a tape cover of a magnetic tape cassette and a preparation thereof.

2. Description of the Prior Art

The conventional tape cassette or cartridge for a video tape cassette comprises a casing (A) holding a magnetic tape and a tape cover (B), provided in front of the casing, for protecting the magnetic tape-running area from dust or mechanical damage as shown in FIG. 1 and the tape cover (B) is hinged to the casing (A) at hinged parts (C),(C') of both ends. Symbols D, E designate the central holes of hubs for winding the magnetic tape.

FIG. 2 is a partially enlarged schematic view of the tape cover (B) which comprises a front plate (1), side plates (2),(3) and an upper plate (4). A reverse insertion detecting notch (5) for preventing the insertion of the cassette or cartridge into a casette set of the video recorder in the erroneous direction, is formed in the boundary of the front plate (1) and the upper plate (4). When the tape cover (B) is formed, the resin-injection port of a mold is provided at a position on the lower edge (6) of the front plate (1); a resin is injected from the port and the gate or sprue formed in the port is cut off after the injected resin is cured. However, such a treatment after the molding requires excessive time for treating the runner in the molding operation; for removing the runner; for grinding and for transportion required for these operations and decreases productivity, thus increasing the total molding and treating time.

The inventors have studied to overcome the disadvantage described above. As a result, they have found that a runner-less product is required to reduce the number of process and the position of the sprue is limited because the entire surface of the molded product must not be treated as it is already a final product.

The inventors have found that the most preferable position is the point designated by the reference numeral (7) in the reverse insertion detecting notch area. However, when the sprue is formed at this point, the following disadvantage causes decrease in the value of the product. The disadvantage will be explained referring to FIG. 4 which is a partially enlarged view of a part of the mold for forming the notch (5) shown in FIGS. 2 and 3 and is a left side view of FIG. 2.

The reference numeral (10) designates a stationary mold and (18) designates a movable mold. When both molds are closed, a cavity (11) for the tape cover is formed. The reference numeral (4) designates the upper plate of the tape cover formed when the resin is injected and (5) designates a portion for forming the reverse insertion detecting notch. A passage (17) for injecting molten resin is provided in the stationary mold (10) and a heating element (8) extending to a gate portion (13) at the lower end of a body (9) for melting the resin is positioned in the passage (17). Heat energy is given to the heating element (8) so as to heat the resin (12) remaining near the gate portion (13) at the same time as resin is injected by the molding machine.

In the operation, the molten resin (12) remains in the gate portion (13) in a semi-molten state in the non-operation time between the injecting times. When the resin is injected, it is melted by heat from the heating element (8) and is injected through the outlet of the gate portion (13) into the cavity (11) of the mold. However, a portion of resin (14) remaining in the gate portion (13) flows into the cavity (11) in a highly viscous state whereby it gathers in a position (15). The continuously injected resin follows paths shown by arrow lines (16) to flow into each part of the cavity (11). A flow mark is caused in the molded product by the viscous mass at the position (15) so that the appearance of the surface of the upper plate (4) is poor.

SUMMARY OF THE INVENTION

It is an object of the present invention to overcome the disadvantage of the conventional tape cover and to provide an improved tape cover and a preparation thereof which reduces the number of processing steps and improves productivity, and, more particularly, prevents the occurrence of a runner at the sprue of the molded product which must be removed and prevents the flow mark.

The foregoing and other objects of the present invention have been attained by providing a tape cover made of resin comprising a single-piece L-shaped body of an upper plate and a front plate and an erroneous insertion detecting notch formed in the joint of the plate, wherein a sprue is formed in the notch and the thickness of the wall of a portion adjacent to the notch in the upper plate is smaller than the distance from the edge of the upper plate to the most remote part of the diameter of the sprue, and by the preparation of the tape cover.

BRIEF DESCRIPTION OF THE DRAWINGS

FIG. 1 is a schematic view of a video tape cassette;

FIG. 2 is a schematic view of the conventional tape cover;

FIG. 3 is a cross sectional view taken along the line A—A' of FIG. 2;

The same reference numerals designate the same or corresponding parts throughout several figures.

DETAILED DESCRIPTION OF THE PREFERRED EMBODIMENT

An embodiment of the present invention will be described in detail.

Figure 4:
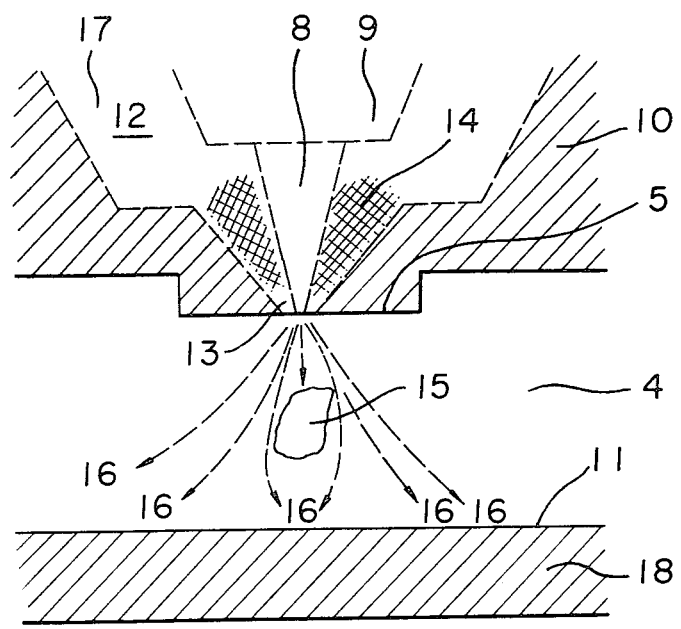
FIG. 4 is a partially enlarged cross sectional view of molds illustrating an injection step for preparing the tape cover as shown in FIGS. 2 and 3.
Figure 5:
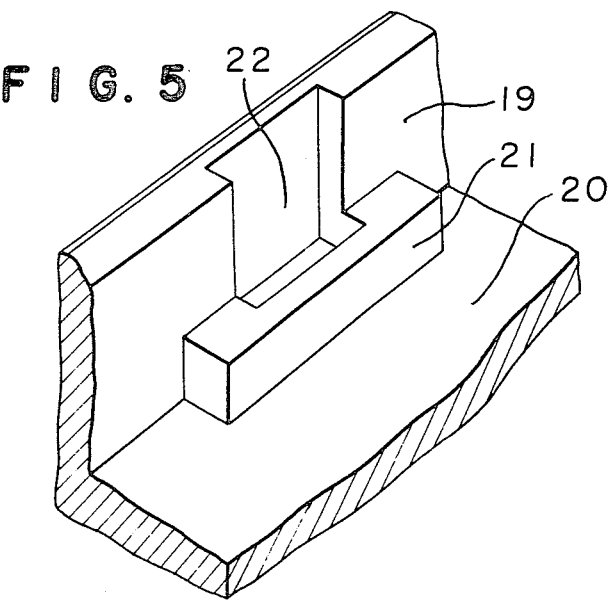
FIG. 5 is a schematic view of the important part of a tape cover of the present invention.
Figure 7:
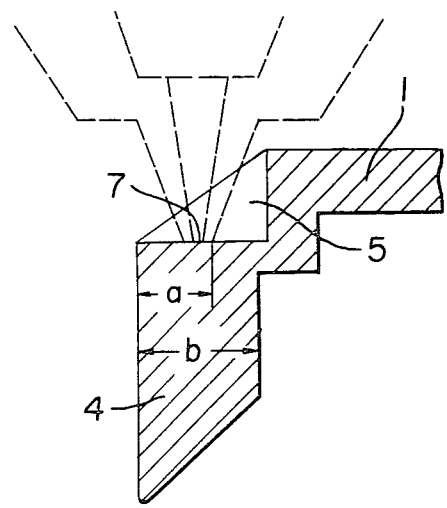
FIG. 7 is a cross sectional view of the conventional tape cover similar to FIG. 6.
Figure 6:
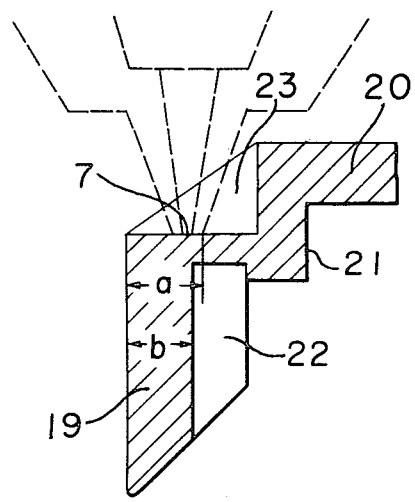
FIG. 6 is a cross sectional view of FIG. 5.

FIG. 5 shows a reverse surface of the tape cover as a molded product wherein the reference numeral (19) designates an upper plate; (20) designates a front plate; (21) designates a wall formed in the reverse side in order to form a reverse insertion detecting notch (22) (FIG. 6) and (22) designates a reduced wall portion formed by a groove which extends from the reverse side of the notch (23) along the reverse surface of the upper plate (19). FIG. 6 is a cross sectional view taken along a part of the notch (23) and FIG. 7 is a cross sectional view similar to FIG. 6 of the conventional tape cover described with reference to FIGS. 2 to 4. In the conventional tape cover, the thickness (b) of the upper plate (4)

in a part of the reverse insertion detecting notch (5) is greater than the distance (a) from the most remote end of the gate outlet of the molding machine to the outer edge of the upper plate (4), whereas in the present invention, the thickness (b) of the reduced wall portion is smaller than the distance from the most remote end (a) of the gate outlet of the molding machine.

Figure 8:
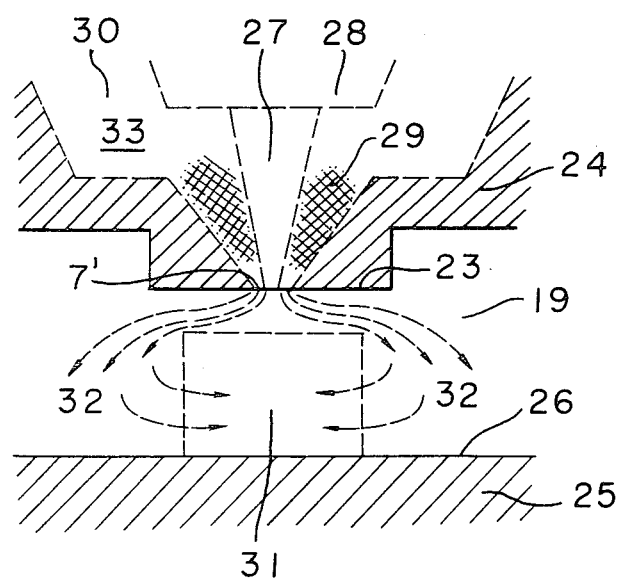
FIG. 8 is a cross sectional view of molds illustrating a method of the present invention.

The mold for molding used for the present invention is similar to the conventional mold except that the reverse insertion detecting notch (23) and the cavity for molding corresponding to the adjacent portion of the notch are shaped so as to give a configuration shown in FIGS. 5 and 6. In FIG. 8, the mold consists of a stationary mold (24) and a movable mold (25) and a cavity (26) for molding is formed by closing the pair of molds so that a molded product having the features described above can be obtained. A projection (31) is provided in the cavity for molding to form the reduced wall portion (22) in the upper plate (19) of the tape cover. The reference numeral (23) designates the reverse insertion detecting notch and (19) designates the upper plate after the molding. A passage (30) is formed in the stationary mold (24) for the flowing of molten resin and a body for heating (28) and a heating element (27) are provided in the passage as with the conventional mold. The passage is filled with molten resin (33) and a semi-molten resin (29) remains near the gate outlet (7') in the non-operation time between the injection times. In the injection operation, the heating element (27) is actuated and the molten resin is forcibly fed into the cavity (26) for molding. Then, the resin having a high viscosity is injected from the gate outlet (7'). However, flow resistance is great for the resin having a high viscosity because the projection (31) is placed near and below the gate outlet (7') to give a narrow resin passage so that the molten resin flow is widely spread as shown in FIG. 8. When a sufficiently molten resin is fed into the mold, it is easily supplied to the reduced wall portion because the flow resistance is small. Thus, no flow mark is produced and so the upper plate has an excellent appearance. More specifically, it is confirmed that a sufficient thickness of the upper plate can be about 2 mm and that of the reduced wall portion can be about 1 mm. The thickness depends upon the position of the sprue. the treatment for trace of the sprue in the molded product becomes unnecessary.

As described above, the tape cover of the present invention eliminates the occurrence of flow mark and the treatment for the trace of the sprue.

What is claimed as new and desired to be secured by Letters Patent of the United States is:

1. A cover for a magnetic tape cassette, comprising:
    an L-shaped molded body formed of a resinous material, said body including a front plate and an upper plate having a joint therebetween;
    an erroneous insertion detection notch formed in said body at a first front plate surface and a second upper plate surface of said joint; and
    a sprue formed on a third surface of said body in said notch, said sprue comprising resinous material from an outlet of a mold, at least a portion of said sprue being spaced from said second surface by a first distance, wherein the thickness of said upper plate adjacent said notch comprises a first thickness, said first thickness being less than said first distance.

2. The cover according to claim 1 wherein said upper plate is provided with a groove to form a reduced wall portion of said first thickness.

* * * * *